United States Patent
McMahan et al.

(10) Patent No.: US 8,458,351 B2
(45) Date of Patent: *Jun. 4, 2013

(54) SUBSTITUTING CONTENT FOR UNDESIRABLE CONTENT IN A WEB BROWSER

(75) Inventors: Paul F. McMahan, Apex, NC (US); Fonda J. Daniels, Cary, NC (US); Patrick R. Guido, Cary, NC (US); Wesley J. Gyure, Wake Forest, NC (US); Kent F. Hayes, Jr., Chapel Hill, NC (US); Robert C. Leah, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/439,486

(22) Filed: Apr. 4, 2012

(65) Prior Publication Data
US 2012/0197985 A1    Aug. 2, 2012

Related U.S. Application Data

(63) Continuation of application No. 11/352,665, filed on Feb. 13, 2006, now Pat. No. 8,195,822.

(51) Int. Cl.
*G06F 15/173* (2006.01)

(52) U.S. Cl.
USPC .......................................................... 709/230

(58) Field of Classification Search
USPC ........................................ 709/230, 223, 220
See application file for complete search history.

(56) References Cited

U.S. PATENT DOCUMENTS 6,226,677 B1 *  5/2001  Slemmer ....................... 709/227
6,324,553 B1   11/2001  Cragun et al.
(Continued)

FOREIGN PATENT DOCUMENTS

JP    10-053331 A    9/1999
JP    11-586065 A    9/2002
(Continued)

OTHER PUBLICATIONS

European Patent Office, PCT International Search Report and Written Opinion for Application No. PCT/EP2007/051208, Jun. 29, 2007, pp. 1-8, Rijswijk, The Netherlands.
Nataraj Nagaratnam, et al., Resource Access Control for an Internet User Agent, Proceedings of the 3rd USENIX Conference on Object-Oriented Technologies and Systems, Jun. 1997, pp. 1-11, USENIX Association, Portland, OR, USA.

(Continued)

*Primary Examiner* — David Eng
(74) *Attorney, Agent, or Firm* — Lee Law, PLLC; Christopher B. Lee

(57) ABSTRACT

A selection of a menu command that identifies a selected area of a web page as containing undesirable content is detected using a user input device of a client computer system executing a web browser that loads source web content from a group of servers. In response to the detection of the selected menu command, an alternate Internet Protocol (IP) address is substituted for a hostname of a website that provided the undesirable content. The alternate IP address is selected based on a content substitution profile of the client computer system. Using the substituted alternate IP address in response to a content request that identifies the undesirable content, the web page is reloaded with substituted source web content received from a server accessed by the alternate IP address displayed in the selected area of the web page instead of displaying the undesirable content identified in the content request.

22 Claims, 6 Drawing Sheets

U.S. PATENT DOCUMENTS

| | | | |
|---|---|---|---|
| 6,493,748 B1 | 12/2002 | Nakayama et al. | |
| 6,701,350 B1 | 3/2004 | Mitchell | |
| 6,704,024 B2 * | 3/2004 | Robotham et al. | 345/581 |
| 6,742,043 B1 * | 5/2004 | Moussa et al. | 709/232 |
| 6,904,569 B1 | 6/2005 | Anderson | |
| 7,013,333 B1 | 3/2006 | Skells | |
| 7,231,458 B2 * | 6/2007 | Tenereillo et al. | 709/241 |
| 7,242,406 B2 * | 7/2007 | Robotham et al. | 345/581 |
| 2001/0029527 A1 | 10/2001 | Goshen | |
| 2003/0098882 A1 | 5/2003 | Cowden et al. | |
| 2003/0115343 A1 | 6/2003 | Mosey | |
| 2003/0145073 A1 | 7/2003 | Lee | |
| 2003/0233482 A1 | 12/2003 | Skrepetos | |
| 2004/0088570 A1 | 5/2004 | Roberts et al. | |
| 2004/0146006 A1 | 7/2004 | Jackson | |
| 2004/0158603 A1 | 8/2004 | Hayashi et al. | |
| 2004/0261096 A1 | 12/2004 | Matz | |
| 2005/0033849 A1 | 2/2005 | Matz | |

FOREIGN PATENT DOCUMENTS

| | | |
|---|---|---|
| JP | 13-100501 A | 10/2002 |
| JP | 15-017989 A | 8/2003 |
| WO | 01/90932 A2 | 11/2001 |
| WO | 2004/104854 A1 | 12/2004 |

OTHER PUBLICATIONS

United States Patent and Trademark Office, Office Action for U.S. Appl. No. 11/352,665, Nov. 18, 2008, pp. 1-15, Alexandria, VA, USA.

United States Patent and Trademark Office, Office Action for U.S. Appl. No. 11/352,665, Apr. 21, 2009, pp. 1-5, Alexandria, VA, USA.

United States Patent and Trademark Office, Office Action for U.S. Appl. No. 11/352,665, Aug. 13, 2009, pp. 1-5, Alexandria, VA, USA.

United States Patent and Trademark Office, Office Action for U.S. Appl. No. 11/352,665, Mar. 12, 2010, pp. 1-8, Alexandria, VA, USA.

United States Patent and Trademark Office, Office Action for U.S. Appl. No. 11/352,665, Jun. 21, 2010, pp. 1-7, Alexandria, VA, USA.

United States Patent and Trademark Office, Office Action for U.S. Appl. No. 11/352,665, Nov. 3, 2010, pp. 1-6, Alexandria, VA, USA.

United States Patent and Trademark Office, Office Action for U.S. Appl. No. 11/352,665, Feb. 4, 2011, pp. 1-6, Alexandria, VA, USA.

United States Patent and Trademark Office, Office Action for U.S. Appl. No. 11/352,665, Jun. 1, 2011, pp. 1-6, Alexandria, VA, USA.

United States Patent and Trademark Office, Notice of Allowance for U.S. Appl. No. 11/352,665, Jan. 27, 2012, pp. 1-11, Alexandria, VA, USA.

* cited by examiner

SUBSTITUTING CONTENT FOR UNDESIRABLE CONTENT IN A WEB BROWSER

RELATED APPLICATIONS

This application is a continuation of and claims priority to and claims the benefit of U.S. patent application Ser. No. 11/352,665 titled "SUBSTITUTING CONTENT FOR UNDESIRABLE CONTENT IN A WEB BROWSER," which was filed in the United States Patent and Trademark Office on Feb. 13, 2006, which issued as U.S. Pat. No. 8,195,822 on Jun. 5, 2012, and which is incorporated herein by reference in its entirety.

BACKGROUND

The present invention generally relates to the Internet, and more specifically relates to a method, system, and computer program product for preventing a web browser from loading content from undesirable sources.

Web pages often include banner advertisements and popup windows that originate from third party sources (e.g., ad servers). For the most part, such banner advertisements and popup windows are well behaved and do not significantly intrude on an end user's experience. However at other times (and this is becoming much more common) banner advertisements and popup windows can be very distracting and annoying to a user and can contain undesirable content. Flashy multimedia in banner advertisements and popup windows can consume significant bandwidth and can even infect a user's computer with unwanted software. Such unwanted software can include, for example, software that covertly gathers user information through a user's Internet connection without his or her knowledge, usually for advertising purposes (e.g., spyware), software (often malicious) that installs itself surreptitiously on a user's computer (e.g., a Trojan horse), or software that causes a popup window to spawn one or more subsequent popup windows when closed by a user. Banner advertisements and popup windows can also contain undesirable content (e.g., an advertisement) that is offensive to some users.

An illustrative web page 10 assembled by a web browser using content retrieved from a plurality of different sources is depicted in FIG. 1. One or more sections of the web page 10 are used to display information that is not necessarily relevant to the main content 12 of the web page 10. In this example, the information is provided in the form of banner advertisements 14, 16 and a popup window 18, which have been delineated from the main content 12 using dotted lines for illustrative purposes only. The information displayed in the banner advertisements 14, 16 and the popup window 18 is retrieved by the web browser rendering the web page 10 from one or more web servers 20. The typically "undesired" content 24 for the banner advertisements 14, 16 and the popup window 18 is obtained by the web browser by pointing to a respective website (e.g., adsite1.com, adsite2.com, adsite3.com) on a respective web server 20 using a hostname (via a domain name service (DNS) or hosts file) or an Internet Protocol (IP) address 26. The "desired" main content 12 of the web page 10 is obtained in a similar manner from one or more websites (e.g., contentsite(s).com) on one or more web servers 20.

Since the undesirable content in a web page usually comes from third party sources, the website hosting the web page is often oblivious to the problems experienced by an end user that are associated with banner advertisements and popup windows. Accordingly, there is a need for a way for a user to selectively block out content from undesirable third party sources while still retaining desirable content in place on a web page.

BRIEF SUMMARY

The present invention provides a method, system, and computer program product for preventing a web browser from loading content from undesirable sources.

A first aspect of the present invention is directed to a method for preventing a web browser from loading content from an undesirable source, comprising: selecting an area of a web page containing undesirable content; substituting an alternate Internet Protocol (IP) address for a hostname of a website that provided the undesirable content based on a profile; and redisplaying the web page with content from the alternate IP address displayed in the selected area of the web page.

A second aspect of the present invention is directed to a system for preventing a web browser from loading content from an undesirable source, comprising: a system for selecting an area of a web page containing undesirable content; a system for substituting an alternate Internet Protocol (IP) address for a hostname of a website that provided the undesirable content based on a profile; and a system for displaying the web page with content from the alternate IP address displayed in the selected area of the web page.

A third aspect of the present invention is directed to a program product stored on a computer readable medium for preventing a web browser from loading content from an undesirable source, the computer readable medium comprising program code for performing the steps of: selecting an area of a web page containing undesirable content; substituting an alternate Internet Protocol (IP) address for a hostname of a website that provided the undesirable content based on a profile; and redisplaying the web page with content from the alternate IP address displayed in the selected area of the web page.

A fourth aspect of the present invention is directed to a method for deploying an application for preventing a web browser from loading content from an undesirable source, comprising: providing a computer infrastructure being operable to: select an area of a web page containing undesirable content; substitute an alternate Internet Protocol (IP) address for a hostname of a website that provided the undesirable content based on a profile; and redisplay the web page with content from the alternate IP address displayed in the selected area of the web page.

A fifth aspect of the present invention is directed to computer software embodied in a propagated signal for preventing a web browser from loading content from an undesirable source, the computer software comprising program code for causing a computer system to perform the following steps: selecting an area of a web page containing undesirable content; substituting an alternate Internet Protocol (IP) address for a hostname of a website that provided the undesirable content based on a profile; and redisplaying the web page with content from the alternate IP address displayed in the selected area of the web page.

The illustrative aspects of the present invention are designed to solve the problems herein described and other problems not discussed.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

Figure 1:
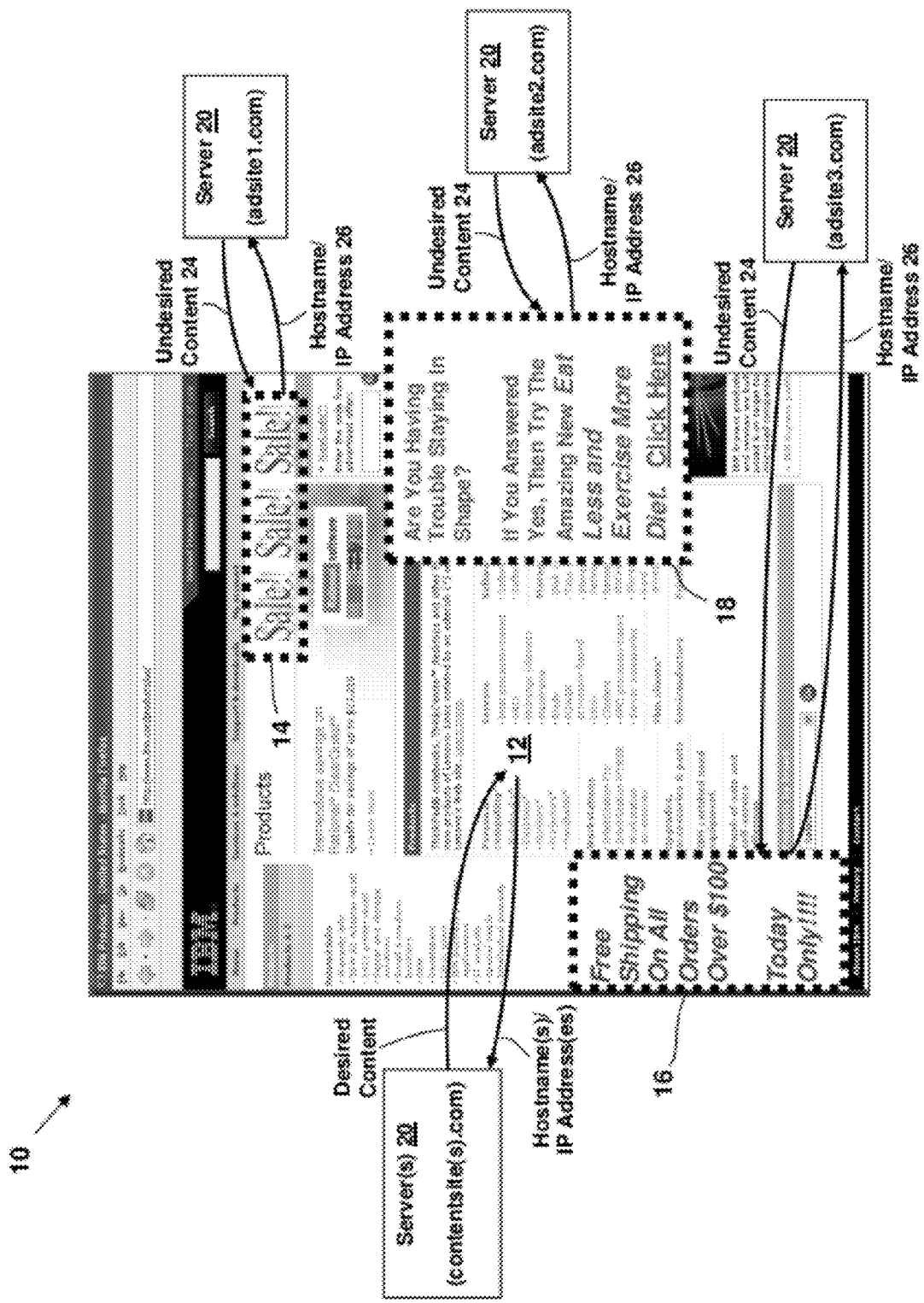
FIG. 1 depicts an illustrative web page including banner advertisements and a popup window.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

The present invention provides a method, system, and computer program product for preventing a web browser from loading content from undesirable sources.

Figure 2:
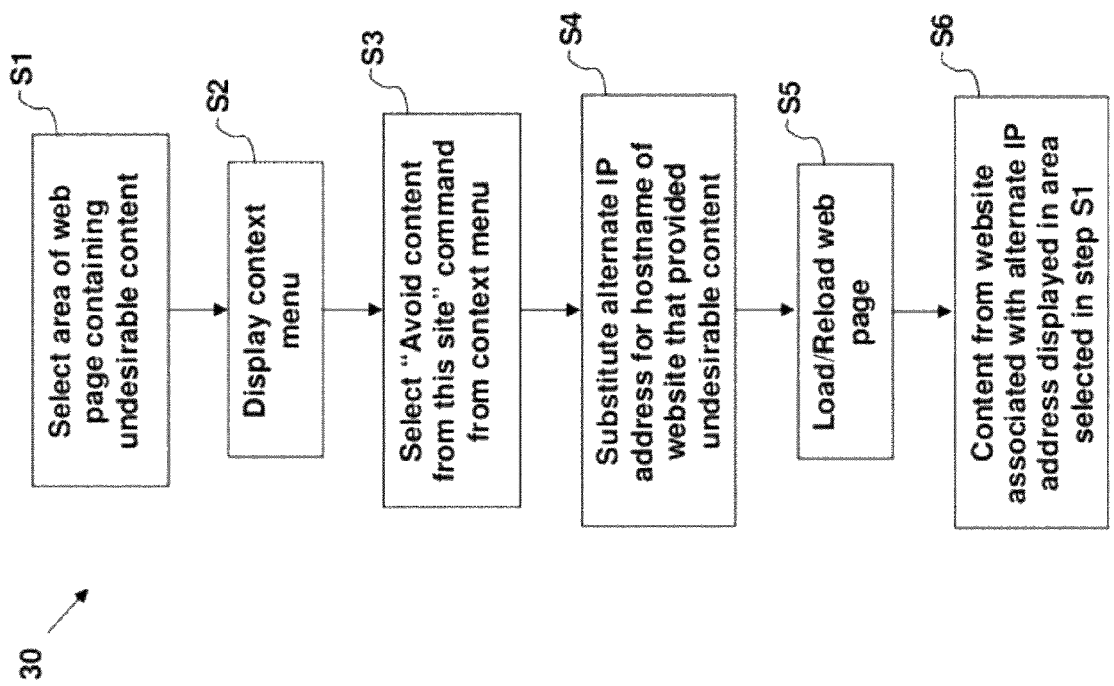
FIG. 2 depicts an illustrative flow diagram of a method in accordance with an embodiment of the present invention.
Figure 3:
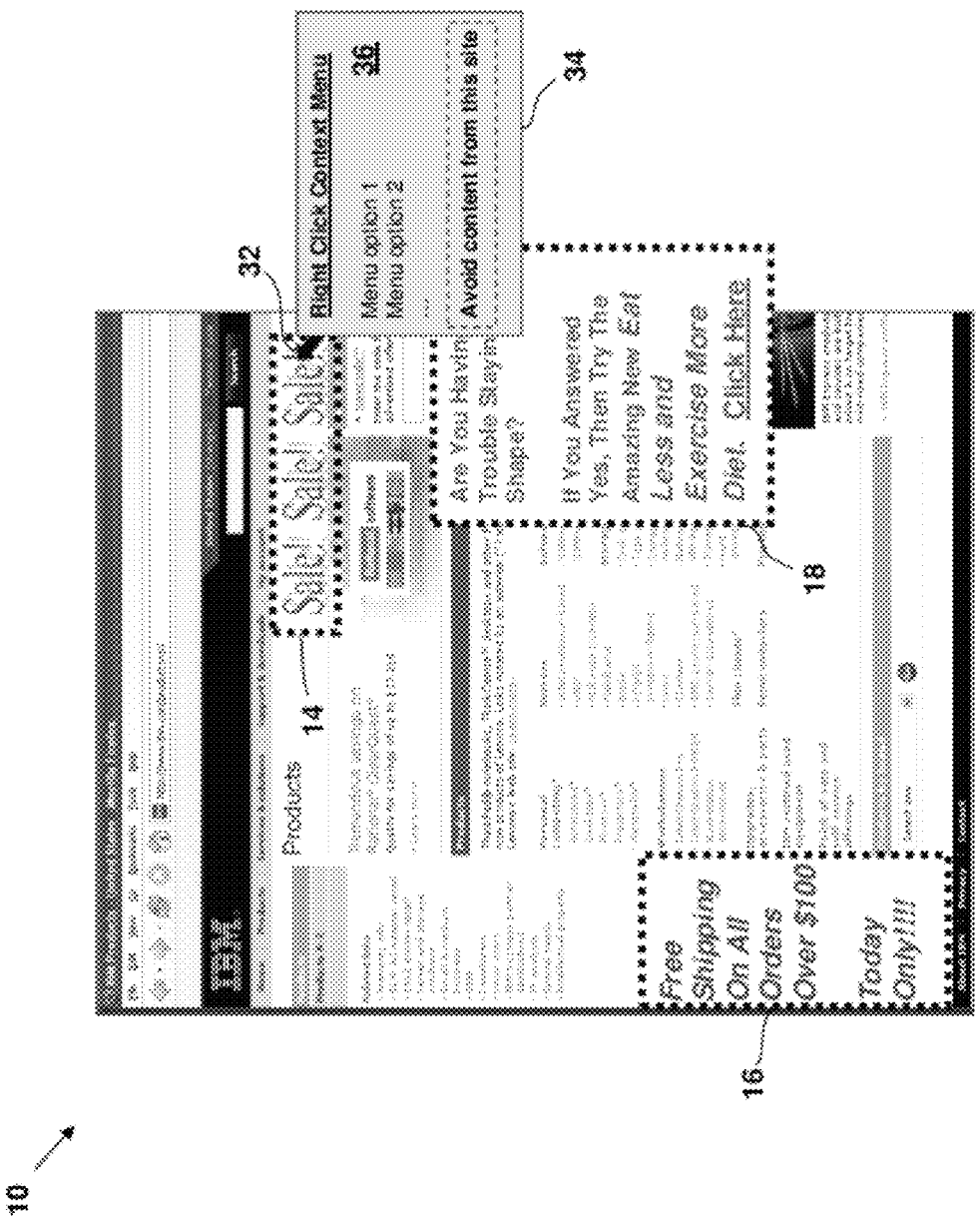
FIGS. 3-5 depict an illustrative operational example in accordance with an embodiment of the present invention.

A flow diagram 30 of a method in accordance with an embodiment of the present invention is depicted in FIG. 2. In step S1, a user selects an area (e.g., banner advertisement, popup window, etc.) of a web page containing undesirable content. As shown in FIG. 3, for example, the user has selected the banner advertisement 14 on the web page 10 by positioning a mouse pointer 32 over the banner advertisement 14 and actuating (e.g., right-clicking) a designated button on the mouse. Other selection methodologies are also possible. In response, a context menu 34 is displayed in step S2. A context menu 34 may also be displayed, for example, in response to an actuation of a function key, keyboard shortcut, etc. In step S3, the user selects the "Avoid content from this site" command 36 from the context menu 34.

Figure 4:
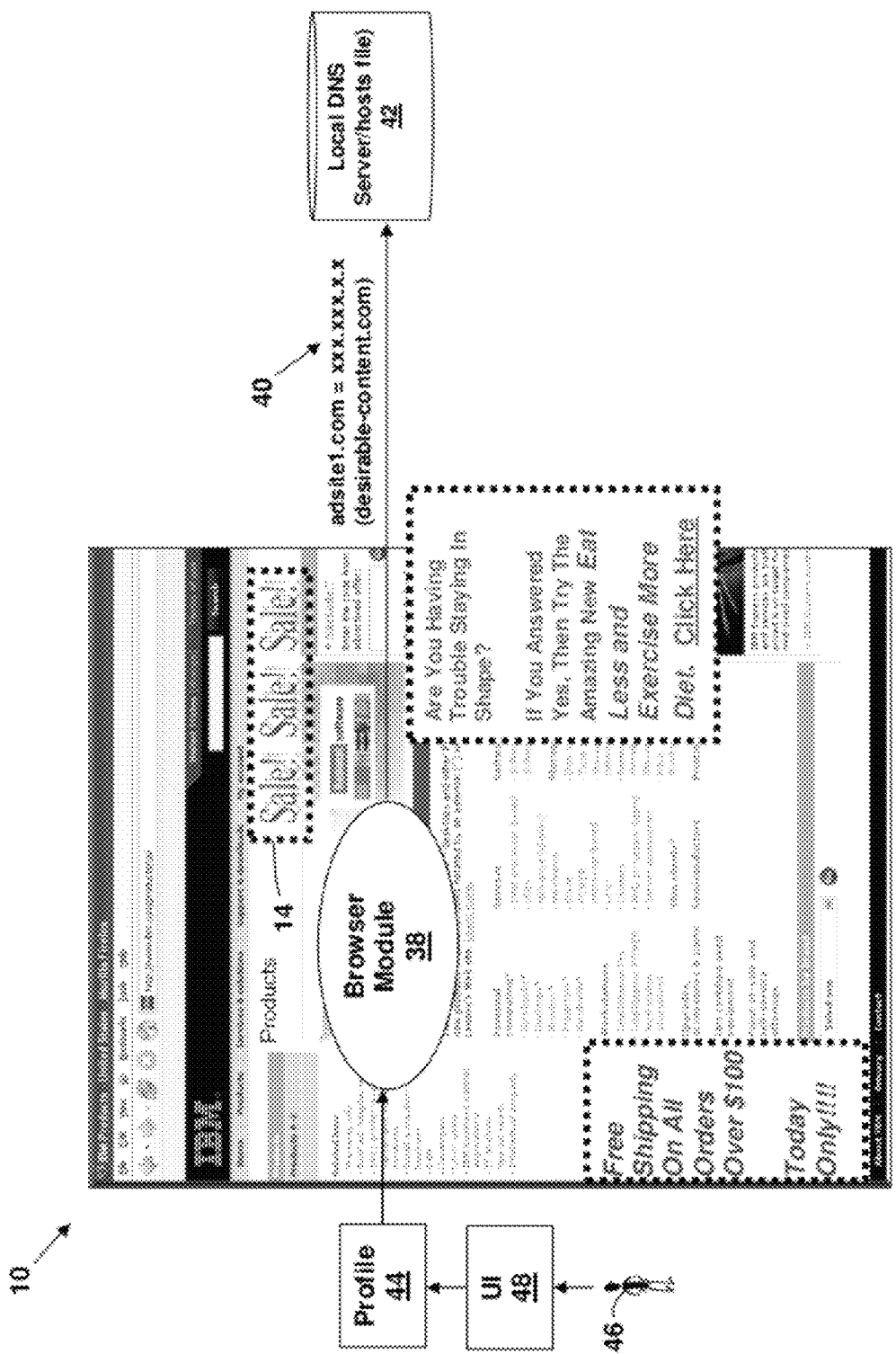

In step S4, in response to the user selection of the "Avoid content from this site" command 36 from the context menu 34, the present invention substitutes an alternate IP address for the hostname of the website that provided the undesirable content. For instance, as shown in FIG. 4, a browser module/plug-in 38 substitutes in a local DNS server 42 (or hosts file) an alternate IP address 40 (e.g., xxx.xxx.x.x) for the hostname (e.g., adsite1.com) of the website that provided the undesirable content. The substitution is based on a profile 44. In this example, the alternate IP address 40 points to a website (e.g., desirable-contentsite.com) that provides more desirable content for display in the banner advertisement 14. One or more profiles 44 can be associated with each user and selectively accessed.

Figure 5:
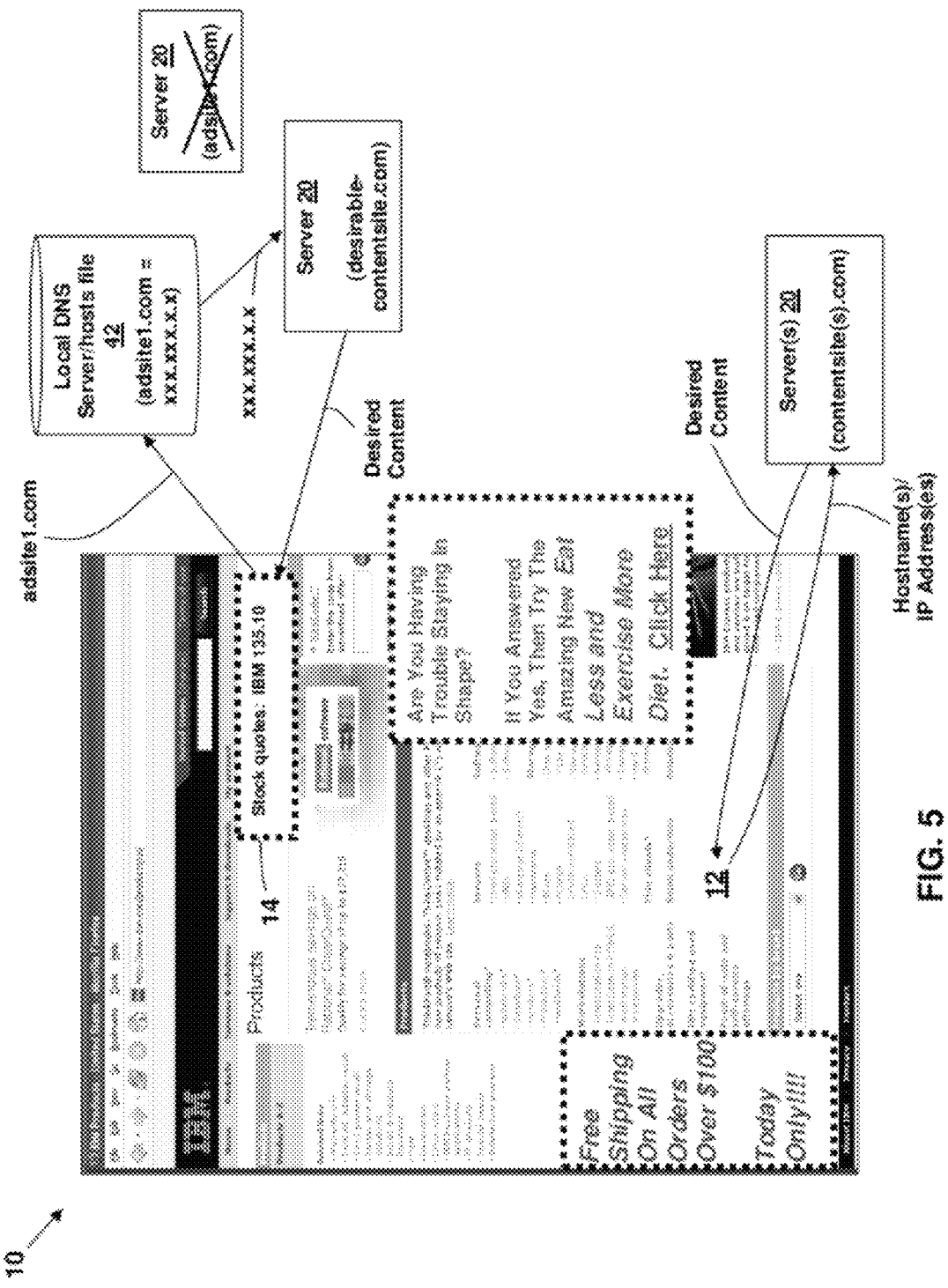

In step S5, the user loads or reloads the web page 10 at a later time. In step S6, content from the website associated with the alternate IP address 40 is displayed in the area selected by the user in step S1. In the above example, as shown in FIG. 5, when a request for content from the website adsite1.com is received by the local DNS server 42 (or hosts file), the local DNS server 42 (or hosts file) now points to the website (desirable-contentsite.com) corresponding to the alternate IP address (xxx.xxx.x.x) provided by the browser module/plug-in 38. As a result, desirable content from the website desirable-contentsite.com, in this example stock quotes, is now displayed in the banner advertisement 14 instead of the undesirable content previously provided by the website adsite1.com.

The profile 44 (FIG. 4) is used to control the content that is loaded in a selected area (e.g., banner advertisement, popup window, etc.) of a web page in place of undesirable content. The profile 44 can be created by a user to drive the behavior of the content loading. Preset profiles 44 are also possible. Virtually any type of profile 44 can be used in the practice of the present invention. For example, the profile 44 could be configured by a user 46 via a user interface (UI) 48 (FIG. 4) to:

Display content (e.g., images, graphics, text, content from a portlet, etc.) from one or more selected websites in place of undesirable content.

Display content pertaining to one or more types of selected subject matter in place of undesirable content.

Display content (advertisements, product information, etc.) from the website of one or more selected entities (e.g., company, organization, retailer, etc.) in place of undesirable content.

Replace undesirable content in popup windows, but not banner advertisements, or vice versa.

Replace undesirable content originating from specific websites with more desirable content.

Replace undesirable content associated with a specific entity (e.g., company, organization, retailer, etc.) or containing a specific type of subject matter (e.g., an advertisement) with other more desirable content.

When used within a corporate intranet or within a service provider's domain, replace undesirable content with more desirable content for the entire set of users for which service is provided.

Figure 6:
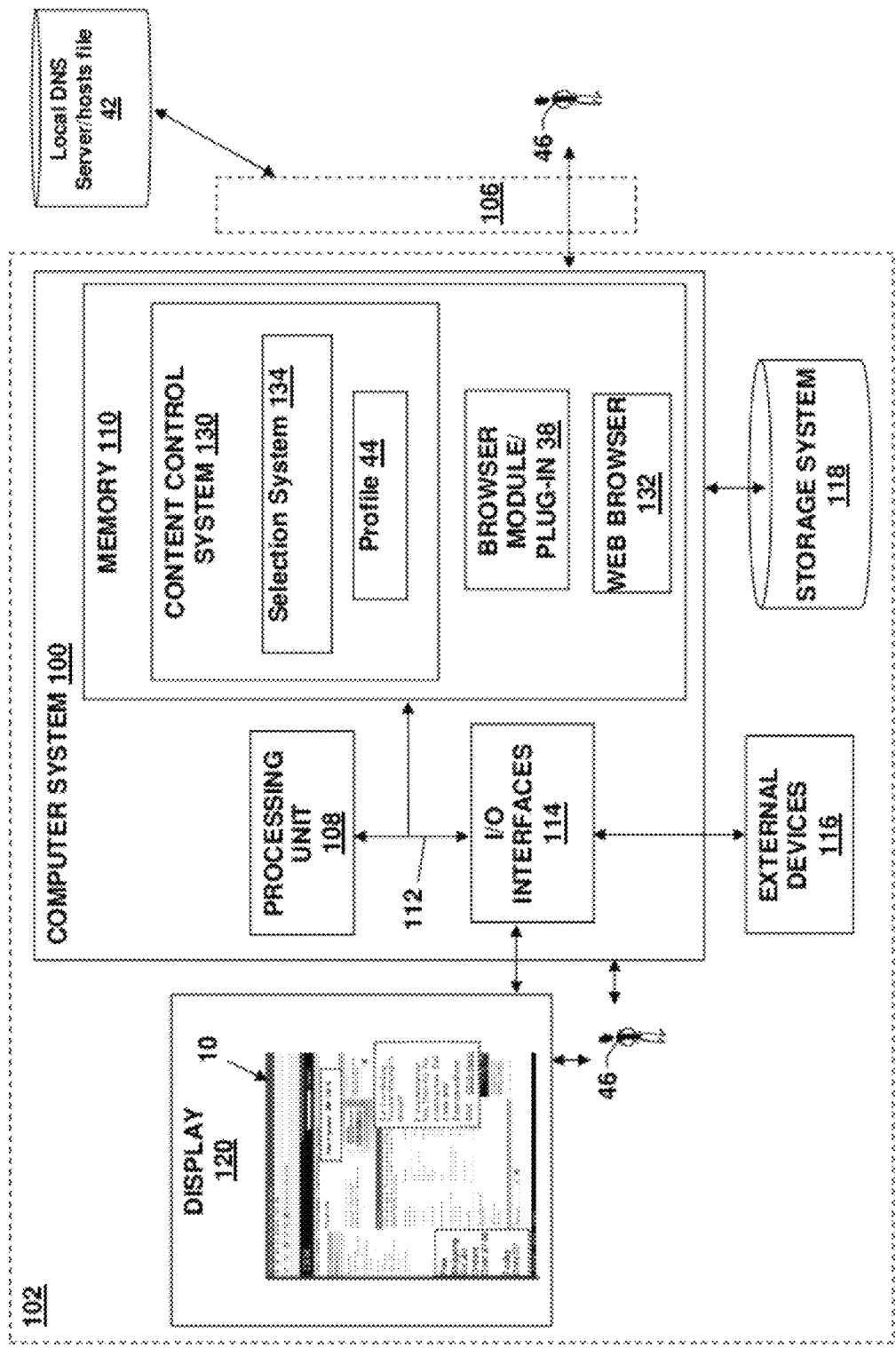
FIG. 6 depicts an illustrative computer system for implementing embodiment(s) of the present invention.

A computer system 100 for preventing a web browser from loading content from undesirable sources in accordance with an embodiment of the present invention is depicted in FIG. 6. Computer system 100 is provided in a computer infrastructure 102. Computer system 100 is intended to represent any type of computer system capable of carrying out the teachings of the present invention. For example, computer system 100 can be a laptop computer, a desktop computer, a workstation, a handheld device, a server, a cluster of computers, etc. In addition, as will be further described below, computer system 100 can be deployed and/or operated by a service provider that provides a service for preventing a web browser from loading content from undesirable sources in accordance with the present invention. It should be appreciated that a user 46 can access computer system 100 directly, or can operate a computer system that communicates with computer system 100 over a network 106 (e.g., the Internet, a wide area network (WAN), a local area network (LAN), a virtual private network (VPN), etc). In the case of the latter, communications between computer system 100 and a user-operated computer system can occur via any combination of various types of communications links. For example, the communication links can comprise addressable connections that can utilize any combination of wired and/or wireless transmission methods. Where communications occur via the Internet, connectivity can be provided by conventional TCP/IP sockets-based protocol, and an Internet service provider can be used to establish connectivity to the Internet.

Computer system 100 is shown including a processing unit 108, a memory 110, a bus 112, and input/output (I/O) interfaces 114. Further, computer system 100 is shown in communication with external devices/resources 116 and one or more storage units 118. In general, processing unit 108 executes computer program code, such as content control system 130, that is stored in memory 110 and/or storage units(s) 118. While executing computer program code, processing unit 108 can read and/or write data, to/from memory 110, storage unit(s) 118, and/or I/O interfaces 114. Bus 112 provides a communication link between each of the components in computer system 100. External devices/resources 116 can comprise any devices (e.g., keyboard, pointing device, display (e.g., display 120, printer, etc.) that enable a user to interact with computer system 100 and/or any devices (e.g., network card, modem, etc.) that enable computer system 100 to communicate with one or more other computing devices.

Computer infrastructure 102 is only illustrative of various types of computer infrastructures that can be used to implement the present invention. For example, in one embodiment, computer infrastructure 102 can comprise two or more computing devices (e.g., a server cluster) that communicate over a network (e.g., network 106) to perform the various process steps of the invention. Moreover, computer system 100 is only representative of the many types of computer systems that can be used in the practice of the present invention, each of which can include numerous combinations of hardware/software. For example, processing unit 108 can comprise a single processing unit, or can be distributed across one or more processing units in one or more locations, e.g., on a client and server. Similarly, memory 110 and/or storage unit(s) 118 can comprise any combination of various types of data storage and/or transmission media that reside at one or more physical locations. Further, I/O interfaces 114 can comprise any system for exchanging information with one or more external devices/resources 116. Still further, it is understood that one or more additional components (e.g., system software, communication systems, cache memory, etc.) not shown in FIG. 6 can be included in computer system 100. However, if computer system 100 comprises a handheld device or the like, it is understood that one or more external devices/resources 116 (e.g., a display) and/or one or more storage unit(s) 118 can be contained within computer system 100, and not externally as shown.

Storage unit(s) 118 can be any type of system (e.g., a database) capable of providing storage for information under the present invention. To this extent, storage unit(s) 118 can include one or more storage devices, such as a magnetic disk drive or an optical disk drive. In another embodiment, storage unit(s) 118 can include data distributed across, for example, a local area network (LAN), wide area network (WAN) or a storage area network (SAN) (not shown). Moreover, although not shown, computer systems operated by user 46 can contain computerized components similar to those described above with regard to computer system 100.

Shown in memory 110 (e.g., as a computer program product) is a content control system 130 for preventing a web browser 132 from loading content from undesirable sources in accordance with embodiment(s) of the present invention. The content control system 130 includes a selection system 134 for selecting (by the user) an area of a web page 10 containing undesirable content. In response to the selection of an area of the web page 10 containing undesirable content, a context menu 34 (FIG. 3) is displayed that includes a command such as "Avoid content from this site." Upon selection of this command, a browser module/plug-in 38 substitutes in a local DNS server 42 (or hosts file) an alternate IP address for the hostname of the website that provided the undesirable content. The provision of the alternate IP address is based on profile information provided in a profile 44. When the web page 10 is subsequently loaded/reloaded, content from the website associated with the alternate IP address is displayed in the selected area of the web page 10, as described above.

The present invention can be offered as a business method on a subscription or fee basis. For example, one or more components of the present invention can be created, maintained, supported, and/or deployed by a service provider that offers the functions described herein for customers. That is, a service provider can be used to provide a service for preventing a web browser from loading content from undesirable sources, as described above.

It should also be understood that the present invention can be realized in hardware, software, a propagated signal, or any combination thereof. Any kind of computer/server system(s)—or other apparatus adapted for carrying out the methods described herein—is suitable. A typical combination of hardware and software can include a general purpose computer system with a computer program that, when loaded and executed, carries out the respective methods described herein. Alternatively, a specific use computer, containing specialized hardware for carrying out one or more of the functional tasks of the invention, can be utilized. The present invention can also be embedded in a computer program product or a propagated signal, which comprises all the respective features enabling the implementation of the methods described herein, and which—when loaded in a computer system—is able to carry out these methods.

The invention can take the form of an entirely hardware embodiment, an entirely software embodiment, or an embodiment containing both hardware and software elements. In a preferred embodiment, the invention is implemented in software, which includes but is not limited to firmware, resident software, microcode, etc.

The present invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device), or a propagation medium. Examples of a computer-readable medium include a semiconductor or solid state memory, magnetic tape, removable computer diskette, random access memory (RAM), read-only memory (ROM), rigid magnetic disk and optical disk. Current examples of optical disks include a compact disk—read only disk (CD-ROM), a compact disk—read/write disk (CD-R/W), and a digital versatile disk (DVD).

Computer program, propagated signal, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible.

What is claimed is:

1. A computer program product comprising a computer readable storage medium that stores computer readable program code, where the computer readable program code when executed on a client computer system causes the client computer system to:
    detect a selection, via a user input device of the client computer system executing a web browser that loads source web content from a plurality of servers, of a menu command that identifies a selected area of a web page as containing undesirable content;

substitute, in response to the detection of the selected menu command that identifies the selected area of the web page as containing the undesirable content, an alternate Internet Protocol (IP) address for a hostname of a website that provided the undesirable content, the alternate IP address being selected based on a content substitution profile of the client computer system; and reload the web page, using the substituted alternate IP address in response to a content request that identifies the undesirable content, with substituted source web content received from a server accessed via the alternate IP address displayed in the selected area of the web page instead of displaying the undesirable content identified in the content request.

2. The computer program product of claim 1, where the area of the web page is selected from a group consisting of a banner and a popup window.

3. The computer program product of claim 1, where, in causing the client computer system to detect the selection, via the user input device of the client computing system, of the menu command that identifies the selected area of the web page as containing undesirable content, the computer readable program code when executed on the client computer system causes the client computer system to:

detect actuation of one of a pointing device, a function key, and a keyboard shortcut;

in response to detection of the actuation, display a context menu; and detect the selection, from the context menu, of the menu command instructing the web browser to avoid content from the website that provided the undesirable content.

4. The computer program product of claim 1, where, in causing the client computer system to substitute, in response to the detection of the selected menu command that identifies the selected area of the web page as containing the undesirable content, the alternate IP address for the hostname of the website that provided the undesirable content, the computer readable program code when executed on the client computer system causes the client computer system to provide the alternate IP address to one of a domain name service (DNS) and a hosts file.

5. The computer program product of claim 1, where, in causing the client computer system to reload the web page, using the substituted alternate IP address in response to a content request that identifies the undesirable content, with substituted source web content received from a server accessed via the alternate IP address displayed in the selected area of the web page instead of displaying the undesirable content identified in the content request, the computer readable program code when executed on the client computer system causes the client computer system to display the substituted source web content from a selected website hosted by the server in place of the undesirable content based on the content substitution profile of the client computing system.

6. The computer program product of claim 1, where, in causing the client computer system to reload the web page, using the substituted alternate IP address in response to a content request that identifies the undesirable content, with substituted source web content received from a server accessed via the alternate IP address displayed in the selected area of the web page instead of displaying the undesirable content identified in the content request, the computer readable program code when executed on the client computer system causes the client computer system to display the substituted source web content pertaining to a particular subject matter in place of the undesirable content based on the content substitution profile of the client computing system.

7. The computer program product of claim 1, where, in causing the client computer system to reload the web page, using the substituted alternate IP address in response to a content request that identifies the undesirable content, with substituted source web content received from a server accessed via the alternate IP address displayed in the selected area of the web page instead of displaying the undesirable content identified in the content request, the computer readable program code when executed on the client computer system causes the client computer system to display the substituted source web content from a website of a selected entity hosted by the server in place of the undesirable content based on the content substitution profile of the client computing system.

8. The computer program product of claim 1, where, in causing the client computer system to substitute, in response to the detection of the selected menu command that identifies the selected area of the web page as containing the undesirable content, the alternate IP address for the hostname of the website that provided the undesirable content, the computer readable program code when executed on the client computer system causes the client computer system to replace the undesirable content originating from a specific website with the substituted source web content received from the alternate IP address based on the content substitution profile of the client computing system.

9. The computer program product of claim 1, where, in causing the client computer system to substitute, in response to the detection of the selected menu command that identifies the selected area of the web page as containing the undesirable content, the alternate IP address for the hostname of the website that provided the undesirable content, the computer readable program code when executed on the client computer system causes the client computer system to replace the undesirable content associated with a specific entity with the substituted source web content received from the alternate IP address based on the content substitution profile of the client computing system.

10. The computer program product of claim 1, where the content substitution profile of the client computing system comprises a plurality of content substitution profiles, each profile associated with one of a set of users and each profile configured to cause the client computer system to substitute desirable content for the undesirable content for the set of users for whom service is provided, and where the set of users comprises at least a portion of one of a corporate set of users associated with an intranet and a set of users associated with a service provider domain.

11. The computer program product of claim 1, where, in causing the client computer system to reload the web page, the computer readable program code when executed on the client computer system causes the client computer system to reload the web page with the substituted source web content at a later time in response to detection of the request for content that identifies the undesirable content at the later time.

12. A method for deploying an application, comprising:

providing a computer infrastructure being operable to:

detect a selection, via a user input device of a client computing system executing a web browser that loads source web content from a plurality of servers, of a menu command that identifies a selected area of a web page as containing undesirable content;

substitute, via the client computing system in response to the detection of the selected menu command that identifies the selected area of the web page as containing the undesirable content, an alternate Internet Protocol (IP) address for a hostname of a website that provided the undesirable content, the alternate IP address being selected based on a content substitution profile of the client computing system; and reload the web page, using the substituted alternate IP address in response to a content request that identifies the undesirable content, with substituted source web content received from a server accessed via the alternate IP address displayed in the selected area of the web page instead of displaying the undesirable content identified in the content request.

13. The method of claim 12, where the area of the web page is selected from a group consisting of a banner and a popup window.

14. The method of claim 12, where, in being operable to detect the selection, via the user input device of the client computing system executing a web browser that loads source web content from a plurality of servers, of the menu command that identifies the selected area of the web page as containing the undesirable content, the computer infrastructure is operable to:

detect actuation of one of a pointing device, a function key, and a keyboard shortcut;

in response to detection of the actuation, display a context menu; and detect the selection, from the context menu, of the menu command instructing the web browser to avoid content from the website that provided the undesirable content.

15. The method of claim 12, where, in being operable to substitute, via the client computing system in response to the detection of the selected menu command that identifies the selected area of the web page as containing the undesirable content, the alternate IP address for the hostname of the website that provided the undesirable content, the computer infrastructure is operable to: provide the alternate IP address to one of a domain name service (DNS) and a hosts file.

16. The method of claim 12, where, in being operable to reload the web page, using the substituted alternate IP address in response to a content request that identifies the undesirable content, with substituted source web content received from a server accessed via the alternate IP address displayed in the selected area of the web page instead of displaying the undesirable content identified in the content request, the computer infrastructure is operable to: display the substituted source web content from a selected website hosted by the server in place of the undesirable content based on the content substitution profile of the client computing system.

17. The method of claim 12, where, in being operable to the reload the web page, using the substituted alternate IP address in response to a content request that identifies the undesirable content, with substituted source web content received from a server accessed via the alternate IP address displayed in the selected area of the web page instead of displaying the undesirable content identified in the content request, the computer infrastructure is operable to: display the substituted source web content pertaining to a particular subject matter in place of the undesirable content based on the content substitution profile of the client computing system.

18. The method of claim 12, where, in being operable to reload the web page, using the substituted alternate IP address in response to a content request that identifies the undesirable content, with substituted source web content received from a server accessed via the alternate IP address displayed in the selected area of the web page instead of displaying the undesirable content identified in the content request, the computer infrastructure is operable to: display the substituted source web content from a website of a selected entity hosted by the server in place of the undesirable content based on the content substitution profile of the client computing system.

19. The method of claim 12, where, in being operable to substitute, via the client computing system in response to the detection of the selected menu command that identifies the selected area of the web page as containing the undesirable content, the alternate IP address for the hostname of the website that provided the undesirable content, the computer infrastructure is operable to: replace the undesirable content originating from a specific website with the substituted source web content received from the alternate IP address based on the content substitution profile of the client computing system.

20. The method of claim 12, where, in being operable to substitute, via the client computing system in response to the detection of the selected menu command that identifies the selected area of the web page as containing the undesirable content, the alternate IP address for the hostname of the website that provided the undesirable content, the computer infrastructure is operable to: replace the undesirable content associated with a specific entity with the substituted source web content received from the alternate IP address based on the content substitution profile of the client computing system.

21. The method of claim 12, where the content substitution profile of the client computing system comprises a plurality of content substitution profiles, each profile associated with one of a set of users and each profile configured to cause the computer infrastructure to substitute desirable content for the undesirable content for the set of users for whom service is provided, and where the set of users comprises at least a portion of one of a corporate set of users associated with an intranet and a set of users associated with a service provider domain.

22. The method of claim 12, where, in being operable to reload the web page, the computer infrastructure is operable to: reload the web page with the substituted source web content at a later time in response to detection of the request for content that identifies the undesirable content at the later time.

* * * * *